US011956512B2

(12) United States Patent
Szabo et al.

(10) Patent No.: US 11,956,512 B2
(45) Date of Patent: Apr. 9, 2024

(54) MEDIA STREAM PRIORITIZATION

(71) Applicant: Telefonaktiebolaget LM Ericsson (publ), Stockholm (SE)

(72) Inventors: Geza Szabo, Kecskemet (HU); Daniel Bezerra, Recife (BR); Wesley Davison Braga Melo, Recife (BR); Djamel Fawzi Hadj Sadok, Jaboatão dos Guararapes (BR); Jairo Matheus Vilaça Alves, Recife (BR); Igor Nogueira de Oliveira, Recife (BR); Sándor Rácz, Cegléd (HU); Maria Silvia Ito, Brasília (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 998 days.

(21) Appl. No.: 16/088,886

(22) PCT Filed: Dec. 2, 2016

(86) PCT No.: PCT/IB2016/057319
§ 371 (c)(1),
(2) Date: Sep. 27, 2018

(87) PCT Pub. No.: WO2017/175047
PCT Pub. Date: Oct. 12, 2017

(65) Prior Publication Data

US 2019/0281364 A1 Sep. 12, 2019

Related U.S. Application Data

(60) Provisional application No. 62/319,500, filed on Apr. 7, 2016.

(51) Int. Cl.
*H04N 21/6373* (2011.01)
*H04L 65/70* (2022.01)
(Continued)

(52) U.S. Cl.
CPC ......... *H04N 21/6373* (2013.01); *H04L 65/70* (2022.05); *H04L 65/80* (2013.01); *H04L 69/164* (2013.01); *H04N 21/64769* (2013.01)

(58) Field of Classification Search
CPC .......... H04N 21/6373; H04N 21/64769; H04L 65/607; H04L 65/80; H04L 69/164
(Continued)

(56) References Cited

U.S. PATENT DOCUMENTS 6,118,456 A * 9/2000 Cooper .................. G06T 15/40 345/619
9,015,335 B1 * 4/2015 Gigliotti ................ G06F 16/40 709/231
(Continued)

OTHER PUBLICATIONS

Navarro-Ortiz, J. et al., "A QoE-Aware Scheduler for HTTP Progressive Video in OFDMA Systems", IEEE Communications Letters, vol. 17, No. 4, Apr. 1, 2013, pp. 677-680, IEEE.
(Continued)

*Primary Examiner* — Cheikh T Ndiaye
*Assistant Examiner* — Ayele F. Woldemariam
(74) *Attorney, Agent, or Firm* — COATS & BENNETT, PLLC

(57) ABSTRACT

A client computing device (115) determines a desired adjustment to a transmission rate of a media stream (245) received from the content server device (110), and encodes the desired adjustment to the transmission rate in an object ordering priority (255) field of a request (250) for a media portion (215). The client computing device (115) sends the request (250) to the content server device (110) to adjust the transmission rate of the media stream (245) with respect to the media portion (215). The content server device (110) receives the request (25) for the media portion (215) from the client computing device (115), and adjusts the transmission rate of the media stream (245) based on the object
(Continued)

ordering priority (255). The content server device (110) transmits the media portion (215) to the client computing device (115) via the media stream (245) at the adjusted transmission rate.

15 Claims, 9 Drawing Sheets

(51) Int. Cl.

| | |
|---|---|
| ***H04L 65/80*** | (2022.01) |
| ***H04L 69/164*** | (2022.01) |
| ***H04N 21/647*** | (2011.01) |

(58) Field of Classification Search

USPC .......................................................... 709/231

See application file for complete search history.

(56) References Cited

U.S. PATENT DOCUMENTS

| | | | | |
|---|---|---|---|---|
| 9,769,527 | B2 * | 9/2017 | Frusina | H04N 21/4621 |
| 2002/0131496 | A1 * | 9/2002 | Vasudevan | H04N 21/2402 375/240.11 |
| 2005/0201351 | A1 * | 9/2005 | Nakao | H04L 1/0002 370/342 |
| 2011/0106964 | A1 * | 5/2011 | Bennett | H04N 21/4622 709/231 |
| 2012/0226987 | A1 * | 9/2012 | Wie | H04L 47/283 715/736 |
| 2012/0311070 | A1 * | 12/2012 | BianRosa | H04N 21/47202 709/217 |
| 2012/0327779 | A1 * | 12/2012 | Gell | H04L 47/623 370/238 |
| 2013/0103849 | A1 * | 4/2013 | Mao | H04N 21/8456 709/231 |
| 2014/0013376 | A1 * | 1/2014 | Xu | H04N 21/25 725/116 |
| 2014/0028100 | A1 | 1/2014 | Vogman | |
| 2014/0244849 | A1 * | 8/2014 | Rizzo | H04L 65/602 709/226 |
| 2014/0258705 | A1 * | 9/2014 | Roskind | H04L 67/2814 713/150 |
| 2014/0281002 | A1 * | 9/2014 | Sun | H04L 29/06455 709/231 |
| 2015/0039686 | A1 * | 2/2015 | Chetlur | H04L 67/306 709/204 |

OTHER PUBLICATIONS

Iyengar, J. et al., "Quic: A UDP-Based Secure and Reliable Transport for HTTP/2", Network Working Group, Internet-Draft, Jun. 17, 2015, pp. 1-30, IETF.

Kung, "Differentiated object priority control mechanism for MPEG-4 streaming", Computer Communications, vol. 29, No. 9, May 31, 2006, pp. 1522-1537, Elsevier Science.

Hamilton, R. et al., "Quic: A UDP-Based Secure and Reliable Transport for HTTP/2 draft-tsvwg-quic-protocol-02", Network Working Group, Internet-Draft, Jan. 13, 2016, pp. 1-38, IETF.

Pan, D. et al., "Buffer management for streaming media transmission in hierarchical data of opportunistic networks", Neurocomputing, vol. 193, Feb. 16, 2016, pp. 42-50, Elsevier, NL.

Szabo, C. et al., "Media QoE Enhancement With QUIC", 2016 IEEE Conference on Computer Communications Workshops (Infocom Wkshps), Apr. 10, 2016, pp. 1-2, IEEE.

* cited by examiner

300

| DURATION | PRIORITY |
|---|---|
| < 20 SEC | HIGH |
| 20-80 SEC | MEDIUM |
| > 80 SEC | LOW |

| PRIORITY | TRANSMISSION RATE (MBPS) |
|---|---|
| HIGH | 8 |
| MEDIUM | 3 |
| LOW | 1 |

| PRIORITY | EMULATED TCP FLOWS |
|---|---|
| HIGH | 5 |
| MEDIUM | 2 |
| LOW | 1 |

FIG. 4B

MEDIA STREAM PRIORITIZATION

RELATED APPLICATIONS

This application claims priority to U.S. Provisional Patent Application Ser. No. 62/319,500 filed 7 Apr. 2016, the entire contents of which are incorporated by reference herein.

BACKGROUND

A popular use of the Internet is to stream media content from a content server device to a client computing device. For example, there are many popular video sharing sites available online from which such media content can be streamed. A media stream can also be used to stream, for example, a web page, including a Hypertext Markup Language (HTML) document and one or more images (or other objects) referenced therein. As technology has improved, demand for higher quality media streams has increased. For example, as screen size and resolution have increased, the demand for high resolution video has also increased. Higher quality media streams generally require more bandwidth than lower quality media streams. Thus, the quality of a media stream may be limited by the amount of bandwidth available for that stream.

Certain protocols allow requests for streamed media portions to include an object ordering priority. When the media stream is used for streaming a single object (e.g., a single video), the object ordering priority of all requests for portions of that object are generally set to the same value. When the media stream is used for streaming multiple objects (e.g., an HTML document and corresponding images), the object ordering priority is generally used to request that a particular object be received before one or more other objects. For example, a high object ordering priority value may be used to request that an HTML document of a web page be streamed first, and a low object ordering priority value may be used to request that an image for an advertisement be streamed last.

BRIEF SUMMARY

Various embodiments of the present disclosure include computer-implemented methods, systems, apparatus, and/or non-transitory computer readable mediums storing computer program products. More particularly, the present disclosure relates to the use of an object ordering priority value for controlling the transmission rate of a media stream between a client computing device and a content server device. In an embodiment, a client computing device determines a desired adjustment to a transmission rate of a media stream received from a content server device, and encodes the desired adjustment to the transmission rate in an object ordering priority field of a request for a media portion. The client computing device sends the request to the content server device to adjust the transmission rate of the media stream with respect to the media portion. The content server device receives the request for the media portion from the client computing device, and adjusts the transmission rate of the media stream based on the object ordering priority. The content server device transmits the media portion to the client computing device via the media stream at the adjusted transmission rate.

Particular embodiments of the present disclosure include a method implemented in a content server device. The method comprises receiving a request for a media portion from a client computing device. The request comprises an object ordering priority. The method further comprises adjusting a transmission rate of a media stream based on the object ordering priority. The method further comprises transmitting the media portion to the client computing device via the media stream at the adjusted transmission rate.

In some embodiments, adjusting the transmission rate comprises increasing or decreasing the transmission rate responsive to the object ordering priority being higher or lower, respectively, than a previous object ordering priority upon which the transmission rate was previously based.

In some embodiments, the method further comprises, responsive to receiving the request comprising the object ordering priority, starting a timer and responsive to the timer expiring, resetting the transmission rate to a default rate. In one embodiment, the method further comprises, responsive to receiving a further request comprising a further object ordering priority, resetting the timer.

In some embodiments, adjusting the transmission rate for the media stream based on the object ordering priority comprises adjusting the transmission rate for the media stream based on a plurality of object ordering priorities received in respective requests for media portions. In one embodiment, the plurality of object ordering priorities are selected based on a window in which the plurality of object ordering priorities were received.

In some embodiments, the method further comprises deciding to adjust the transmission rate based on a type of content in the media stream, and adjusting the transmission rate in response.

In some embodiments, the request is a Quick UDP Internet Connections (QUIC) request.

Other embodiments of the present disclosure include a method implemented in a client computing device. The method comprises determining a desired adjustment to a transmission rate of a media stream received from a content server device. The method further comprises encoding the desired adjustment to the transmission rate in an object ordering priority field of a request for a media portion. The method further comprises sending the request to the content server device to adjust the transmission rate of the media stream with respect to the media portion.

In some embodiments, encoding the desired adjustment to the transmission rate in the object ordering priority field comprises encoding an object ordering priority value based on a duration of time remaining to complete output of a previously received media portion. In one embodiment, encoding the object ordering priority value based on the duration of time remaining comprises encoding a higher or lower object ordering priority value responsive to the duration of time remaining being below or above a threshold, respectively.

In some embodiments, the method further comprises generating a Uniform Resource Locator (URL) comprising a name/value pair specifying the desired adjustment to the transmission rate. Further, encoding the desired adjustment to the transmission rate in an object ordering priority field comprises encoding an object ordering priority value based on the value of the name/value pair in the URL.

In some embodiments, the request is a Quick UDP Internet Connections (QUIC) request.

Other embodiments of the present disclosure include a content server device. The content server device comprises interface circuitry and processing circuitry communicatively coupled to the interface circuitry. The interface circuitry is configured to exchange communications with a client computing device. The processing circuitry is configured to receive a request for a media portion from a client computing device via the interface circuitry. The request comprises an object ordering priority. The processing circuitry is further configured to adjust a transmission rate of a media stream based on the object ordering priority, and transmit the media portion to the client computing device via the media stream at the adjusted transmission rate via the interface circuitry.

In some embodiments, to adjust the transmission rate, the processing circuitry is configured to increase or decrease the transmission rate responsive to the object ordering priority being higher or lower, respectively, than a previous object ordering priority upon which the transmission rate was previously based.

In some embodiments, the processing circuitry is further configured to, responsive to receiving the request comprising the object ordering priority, start a timer and in response to the timer expiring, reset the transmission rate to a default rate. In one embodiment, the processing circuitry is further configured to, responsive to receiving a further request comprising a further object ordering priority, reset the timer.

In some embodiments, to adjust the transmission rate for the media stream based on the object ordering priority, the processing circuitry is configured to adjust the transmission rate for the media stream based on a plurality of object ordering priorities received in respective requests for media portions. In one embodiment, the plurality of object ordering priorities are selected based on a window in which the plurality of object ordering priorities were received.

In some embodiments, the processing circuitry is further configured to decide to adjust the transmission rate based on a type of content in the media stream, and adjust the transmission rate in response.

In some embodiments, the request is a Quick UDP Internet Connections (QUIC) request.

Other embodiments of the present disclosure include a client computing device. The client computing device comprises interface circuitry and processing circuitry communicatively coupled to the interface circuitry. The interface circuitry is configured to exchange communications with a content server device. The processing circuitry is configured to determine a desired adjustment to a transmission rate of a media stream received from a content server device via the interface circuitry. The processing circuitry is further configured to encode the desired adjustment to the transmission rate in an object ordering priority field of a request for a media portion. The processing circuitry is further configured to send the request via the interface circuitry to the content server device to adjust the transmission rate of the media stream with respect to the media portion.

In some embodiments, to encode the desired adjustment to the transmission rate in the object ordering priority field, the processing circuitry is configured to encode an object ordering priority value based on a duration of time remaining to complete output of a previously received media portion. In one embodiment, to encode the object ordering priority value based on the duration of time remaining, the processing circuitry is configured to encode a higher or lower object ordering priority value responsive to the duration of time remaining being below or above a threshold, respectively.

In some embodiments, the processing circuitry is further configured to generate a Uniform Resource Locator (URL) comprising a name/value pair specifying the desired adjustment to the transmission rate. To encode the desired adjustment to the transmission rate in an object ordering priority field, the processing circuitry is configured to encode an object ordering priority value based on the value of the name/value pair in the URL.

In some embodiments, the request is a Quick UDP Internet Connections (QUIC) request.

Other embodiments comprise a carrier containing one or more of the computer programs described above, wherein the carrier is one of an electrical signal, optical signal, radio signal, or computer readable storage medium.

Other embodiments comprise a non-transitory computer-readable storage medium containing a computer program comprising executable instructions that, when executed by processing circuitry of one or more of the devices described above causes the device to perform any one of the methods described above.

Of course, the present invention is not limited to the above features and advantages. Indeed, additional features and advantages are presented in the following detailed description, and in the accompanying drawings.

BRIEF DESCRIPTION OF THE DRAWINGS

FIG. 3 is a table of an example encoding scheme according to one or more embodiments.

FIG. 4A is a table of an example transmission rate adjustment scheme according to one or more embodiments.

FIG. 4B is a table of a different example transmission rate adjustment scheme according to one or more embodiments.

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

Figure 1:
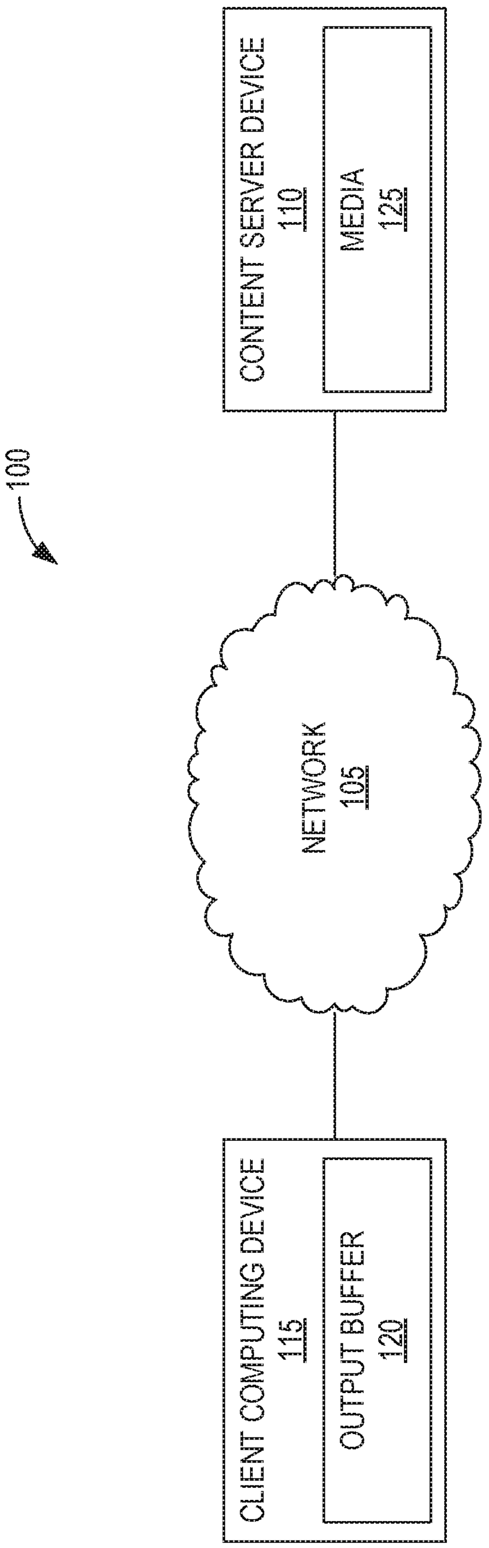
FIG. 1 is a block diagram of an example computing environment according to one or more embodiments.

FIG. 1 illustrates an example network environment 100 that includes a content server device 110, a client computing device 115, and a communication network 105. The content server device 110 and the client computing device 115 are both communicatively connected to, and exchange signals with each other via, the communication network 105. The signals support a media stream that delivers media 125 on the content server device 110 into the output buffer 120 of the client computing device 115.

Typical examples of the content server device 110 include a server computer and/or server cluster. Other examples of the content server device 110 include a personal computer, a laptop computer, a desktop computer, a workstation, a smartphone, a tablet computer, a wearable computer, a smart appliance, network attached storage, and/or a storage area network. As will be more fully described later, media 125 may be stored in a non-transitory storage medium of the content server device 110. This media 125 may comprise, for example, audio, video, images, documents, and/or multimedia data.

Typical examples of the client computing device 115 include a personal computer, a laptop computer, a desktop computer, a workstation, a smartphone, a tablet computer, a wearable computer, and/or a smart appliance. Other examples of the client computing device 115 include a server computer, a server cluster, network attached storage, and/or a storage area network. The client computing device 115 stores one or more portions of the media 125 in the output buffer 120 for output to a user. As will be more fully described later, this output buffer 120 may be comprised in a non-transitory storage medium of the client computing device 115.

The communication network 105 includes one or more physical devices and/or signaling mediums capable of exchanging communication signals with the content server device 110 and client computing device 115. Such communications signals may comprise, for example, Quick UDP Internet Connections (QUIC) messages. Examples of such a communication network 105 may include (but are not limited to) one or more of: the Internet (or a portion thereof); one or more local area networks; one or more wireless networks; one or more cellular networks; one or more Internet Protocol-based networks; one or more Ethernet networks; and one or more optical networks. Such a communication network 105 may comprise any number of networking devices such as routers, gateways, switches, hubs, firewalls, and the like (not shown) supporting the exchange of these communication signals.

Figure 2:
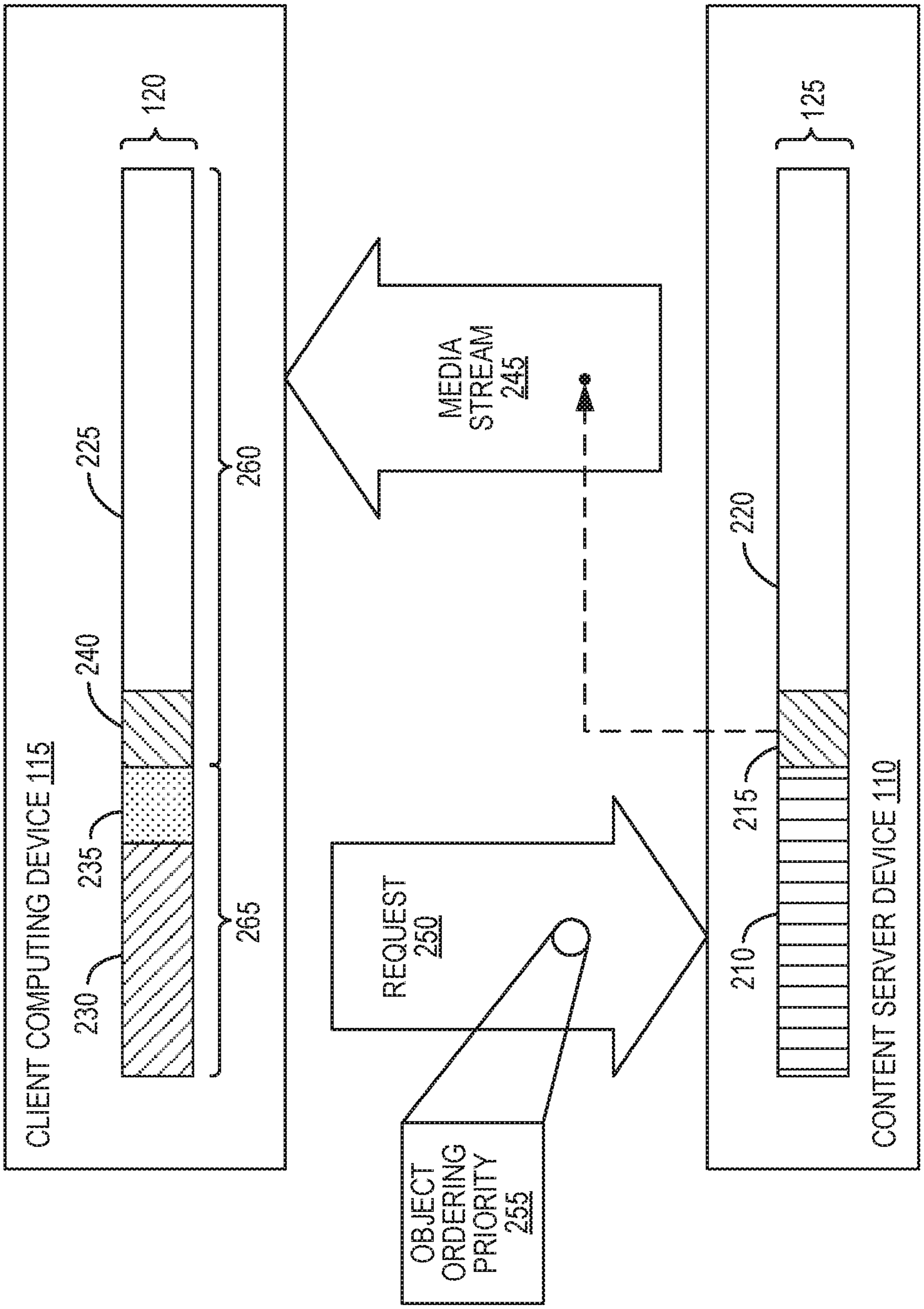
FIG. 2 is a block diagram of an example of streaming media from a content server device to a client computing device, according to one or more embodiments.

FIG. 2 illustrates an example of streaming a media portion 215 of media 125 from the content server device 110 to the output buffer 120 of client computing device 115 via a media stream 245. As will be discussed in greater detail below, the client computing device 115 transmits a request 250 for the media portion 215, and in response, the content server device 110 transmits the requested media portion 215 in the media stream 245.

The media 125 comprises an already transmitted block 210, the media portion 215, and an untransmitted block 220. The media portion 215 is being transmitted via the media stream 245 to the output buffer 120 of the client computing device 115. The output buffer 120 comprises a successfully received block 265 and available buffer space 260. The available buffer space 260 comprises an assigned space 240 and an unassigned space 225. The assigned space 240 is designated to store the media portion 215 once received via the media stream 245. Once the media portion 215 is received by the client computing device 115, the assigned space 240 storing the media portion 215 is added to the successfully received block 265. The unassigned space 225 is space that is available to store the untransmitted block 220, which the client computing device 115 may later receive.

The successfully received block 265 is a copy of the already transmitted block 210, which was previously transmitted via the media stream 245 at a particular transmission rate. The client computing device 115 sends the request 250 for media portion 215 in response to having received the successfully received block 265 via the media stream 245. This request 250 is encoded based on a desired adjustment to the transmission rate of the media stream 245.

The client computing device 115 may be outputting certain content from the media stream 245 while other content from the media stream 245 is being received from the content server device 110. According to this example, the successfully received block 265 comprises a previously output block 230 and a pending output block 235. The previously output block comprises content from the media stream 245 that has already been output by the client computing device 115. The pending output block 235 has yet to be output by the client computing device 115. For example, the successfully received block 265 may be one minute and thirty seconds of video data, the first minute of which has already been rendered on a display of the client computing device 115 and the last thirty seconds of which have not. In such an example, the previously output block 230 may be the first minute, whereas pending output block 235 may be the remaining thirty seconds.

According to particular embodiments, the client computing device 115 may be outputting media content from the output buffer 120 at a rate that is significantly different (i.e., faster or slower) than the transmission rate of the media stream 245. Such a scenario may negatively impact the quality of experience of a user of the client computing device 115. For example, if the client computing device 115 is outputting media content from the output buffer 120 at a significantly faster rate than the transmission rate of the media stream 245, the user may experience video playback stuttering and buffering delays. Alternatively, if the client computing device 115 is outputting media content from the output buffer 120 at a significantly slower rate than the transmission rate of the media stream 245, the user may experience sluggish performance as high amounts of bandwidth and/or memory resources are consumed to rapidly fill the output buffer 120.

The client computing device 115 may determine that an adjustment to the transmission rate of the media stream 245 would be desirable, for example, in response to detecting that user quality of experience is impaired. In some embodiments, this desired adjustment would more closely align the transmission rate of the media stream 245 with an output rate from the output buffer 120.

The client computing device 115 encodes the request 250 for media portion 215 based on the desired adjustment to the transmission rate. In particular, the desired adjustment may be encoded in an object ordering priority field of the request 250 that specifies an object ordering priority 255. The content server device 110 adjusts the transmission rate of the media stream 245 based on the object ordering priority 255, and transmits media portion 215 to the client computing device 115 via the media stream 245 at the adjusted transmission rate. The content server device 110 may additionally change the transmission order of objects in the requested media portion 215, according to particular embodiments.

The client computing device 115 may encode the desired adjustment to the transmission rate into the object ordering priority field as a value that is based on a duration of time remaining to complete output of a previously received media portion. In particular, as illustrated by the example encoding scheme 300 of FIG. 3, the client computing device 115 may encode the desired adjustment to the transmission rate based on a duration of time to output pending output block 235. According to the example encoding scheme 300, the client computing device 115 will encode a high object ordering priority in response to the duration of time to output pending output block 235 being less than twenty seconds. The client computing device 115 will encode a medium object ordering priority, according to the example encoding scheme 300, in response to the duration of time to output pending output block 235 being between twenty and eighty seconds. Finally, the client computing device 115 will encode a low object ordering priority, according to the example encoding scheme 300, in response to the duration of time to output pending output block 235 being more than eighty seconds. Although the example encoding scheme 300 comprises encoding a higher or lower object ordering priority value responsive to the duration of time to output pending output block 235 being below or above a threshold, respectively, other embodiments may have additional or fewer thresholds, each of which may be set at a different time duration.

In some embodiments, the desired adjustment to the transmission rate is determined by a first software entity, and encoded into the request 250 by a second software entity. For example, the desired adjustment to the transmission rate may be determined by software rendering the media 125 on the client computing device 115, whereas the request 250 may be encoded by a Hypertext Transfer Protocol (HTTP) handling function of a web browser or operating system. One or more intermediate software entities may, according to embodiments, be in a messaging path between the first and second software entities. These intermediate software entities may be unaware of how the desired adjustment will be encoded.

Accordingly, in some embodiments, the media rendering software of the client computing device 115 determines the desired adjustment to the transmission rate, and generates a Uniform Resource Locator (URL) comprising a name/value pair specifying this desired adjustment (e.g., "http://example.com/media.mp4?portion=5&priority=high", wherein the "priority=high" name/value pair specifies a desired increase in the transmission rate). The media rendering software passes this URL to the HTTP handling function of the client computing device 115 that recognizes the name/value pair specifying the desired adjustment, and encodes the desired adjustment in the object ordering priority field of the request 250 in response. The value encoded into the request 250 may be a literal text string (e.g., "high") or may be a corresponding value (e.g., 100%, H, or 0) that will be recognized by the content server device 110. In this way, software that is tracking the state of the output buffer 120 may notify software generating communication packets for the content server device 110 of the desired adjustment, and the encoded request will be readily understood by the content server device 110. Other embodiments of the client computing device 115 may include other hardware or software entities for determining the desired adjustment to the transmission rate and/or encoding the desired adjustment into the request 250.

The content server device 110 receiving such a request 250 may adjust the transmission rate based on the received object ordering priority 255 using a transmission rate adjustment scheme. An example of such a transmission rate adjustment scheme 400*a* is illustrated in FIG. 4A. According to this example, the content server device 110 sets the transmission rate to 8 Mbps, 3 Mbps, or 1 Mbps in response to the object ordering priority 255 being high, medium, or low, respectively.

According to other embodiments, the content server device 110 may adjust the transmission rate indirectly, such as by manipulating a particular transmission control mechanism, for example. The example transmission rate adjustment scheme 400*b* of FIG. 4B indirectly produces a similar transmission rate adjustment as the example transmission rate adjustment scheme 400*a* of FIG. 4A by emulating a different number of Transmission Control Protocol (TCP) flows in support of the media stream 245 based on the object ordering priority 255 in the request 250. According to the example of FIG. 4B, the content server device 110 will set the number of emulated TCP flows to 5, 2, or 1, in response to the object ordering priority 255 being high, medium, or low, respectively.

As one example, application software on the content server device 110 may be configured to package traffic for transmission over the communication network 105 using a plurality of TCP streams, despite the media stream 245 actually comprising only a single stream of non-TCP data packets (e.g., QUIC packets). Thus, the content server device 110 may convert packets exchanged with the application software between TCP and, e.g., QUIC packets. In such case, the content server device 110 may emulate an additional TCP stream requested by the application software by increasing the transmission rate of QUIC packets. In other words, setting the number of emulated TCP flows to 1 may be implemented by converting TCP packets corresponding to a single TCP socket for the application software according to a single share of the transmission bandwidth available to the content server device 110. Similarly, setting the number of emulated TCP flows to 5 may be implemented by converting TCP packets corresponding to five TCP sockets using five shares of the transmission bandwidth available to the content server device 110, without adding an additional stream of QUIC packets. Accordingly, the content server may adjust the transmission rate based on the object ordering priority 255 by increasing or decreasing the number of transmission bandwidth shares allocated to the media stream 245, e.g., by adjusting the number of emulated TCP flows allocated to application software streaming the media stream 245.

According to a different example in which the content server device 110 transmits the media stream 245 using QUIC packets, the content server device 110 may use the object ordering priority 255 to influence congestion control (CC) performed at the content server device. In particular, the content server device 110 may extract the object ordering priority 255 from the request 250 and use the object ordering priority 255 to adjust the aggressiveness level of the CC of TCP emulation within the QUIC protocol. One particular embodiment includes influencing the CC mechanism by extending the namespace of the object ordering priority 255 at the content server device 110. Other embodiments may modify the aggressiveness level of the CC using a message that is different or separate from the request 250.

In one example of adjusting the aggressiveness level of the CC of TCP emulation, the content server device 110 updates a paralellTCPflowsemulation parameter used for CC based on the object ordering priority 255. The content server device 110 maps the object ordering priority 255 to a QUIC priority on a scale (e.g., with 0 as the highest value and 6 as the lowest value on the scale). The traditional use of the object ordering priority 255 to specify the order in which objects should be transmitted may be retained in such an example. This paralellTCPflowsemulation parameter may be set to 5, 2, or 1 based on whether a high, medium, or low object ordering priority, respectively, is received.

Such a parameter is not a within-flow scheduling parameter, but controls transmission across flows. In other words, the parameter alters the aggressiveness of the UDP stream such that increasing it results in a less fair behavior, seizing more resources from other flows sharing the same networking bottleneck. In contrast, decreasing the aggressiveness parameter results in more altruistic transmission behavior between flows. In other words, the QUIC-based media stream 245 and/or session receives more bandwidth over a shared bottleneck. Accordingly, embodiments will also signal such prioritization information to a packet scheduler, e.g., in case of per user scheduling.

One example of the application software streaming the media stream 245 may be, for example, a HTTP server. Other embodiments may adjust the transmission rate of media stream 245 by emulating other types of streams, may emulate TCP streams in other ways, involve other types of application software and/or may apply additional or fewer flow emulation levels.

Further, embodiments of the content server device 110 may adjust the transmission rate based on a plurality of object ordering priorities received in respective requests for media portions. This plurality of object ordering priorities may, according to embodiments, be selected based on a window in which they were received. For example, in response to receiving the request 250, the content server device 110 may take an average of the last five object ordering priorities received and apply a transmission rate adjustment scheme 400 based on the average. Alternatively, the content server device 110 may take an average of the object ordering priorities received within the last five minutes. Such an average may be weighted such that more recently received object ordering priorities influence the average more or less heavily than less recently received object ordering priorities. Other embodiments may evaluate the plurality of object ordering priorities in other ways in order to adjust the transmission rate.

The transmission rate may, according to embodiments, be adjusted for only a limited time. For example, in response to receiving the request 250 comprising the object ordering priority 255, the content server device 110 may start a timer and after adjusting the transmission rate, reset the transmission rate to a default rate upon expiration of that timer. Alternatively, if a subsequent request is received that comprises a further object ordering priority before the timer expires, the content server device 110 may reset the timer. The value of this timer may be predetermined or may be based on the adjustment made to the transmission rate, according to embodiments.

In addition, in some embodiments, the content server device 110 only adjusts the transmission rate in response to the request for one or more particular types of content. For example, in response to receiving the request 250, the content server device 110 may determine whether the media 125 (or more particularly, the requested media portion 215), comprises a particular type of content (e.g., video content), and if so, decide to adjust the transmission rate according to a corresponding transmission rate adjustment scheme 400. If the media 125 (or media portion 215) does not comprise the particular type of content, the content server device 110 may decide to transmit the media portion 215 to the client computing device 115 without adjusting the transmission rate of the media stream 245.

Figure 5:
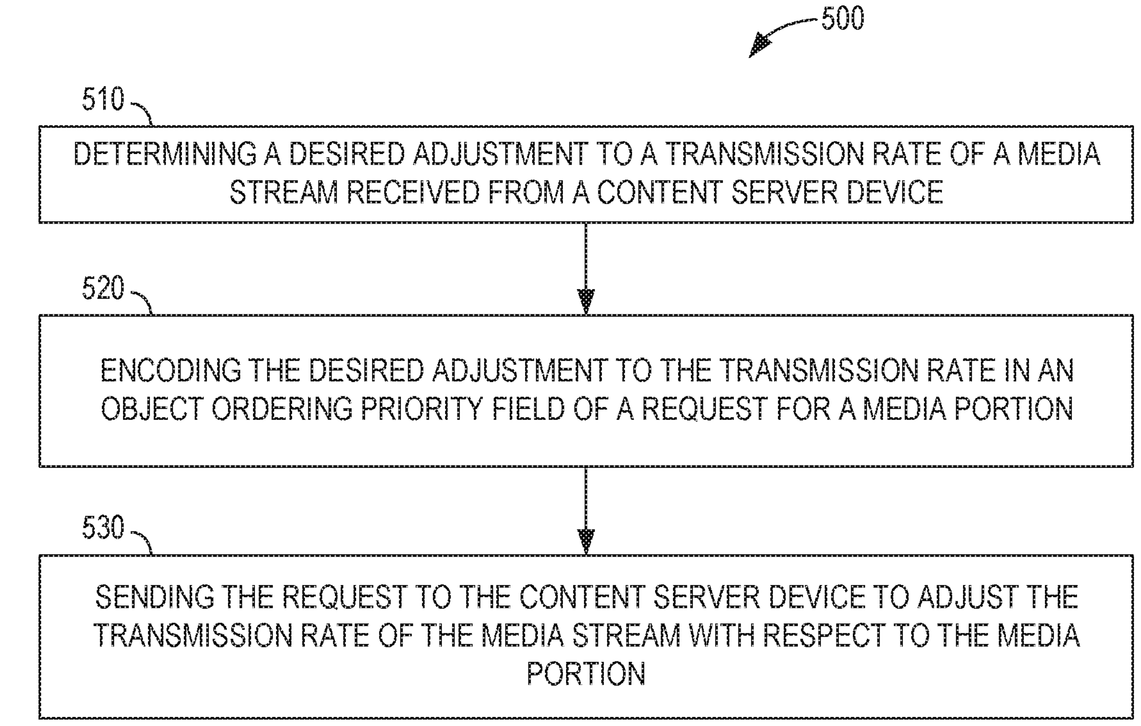
FIG. 5 is a flow diagram illustrating an example method implemented in a client computing device according to one or more embodiments.

In view of the above, FIG. 5 illustrates an example method 500 implemented in a client computing device 115. The method 500 comprises determining a desired adjustment to a transmission rate of a media stream 245 received from a content server device 110 (block 510). The method 500 further comprises encoding the desired adjustment to the transmission rate in an object ordering priority 255 field of a request 250 for a media portion 215 (block 520). The method 500 further comprises sending the request 250 to the content server device 110 to adjust the transmission rate of the media stream 245 with respect to the media portion 215 (block 530).

Figure 6:
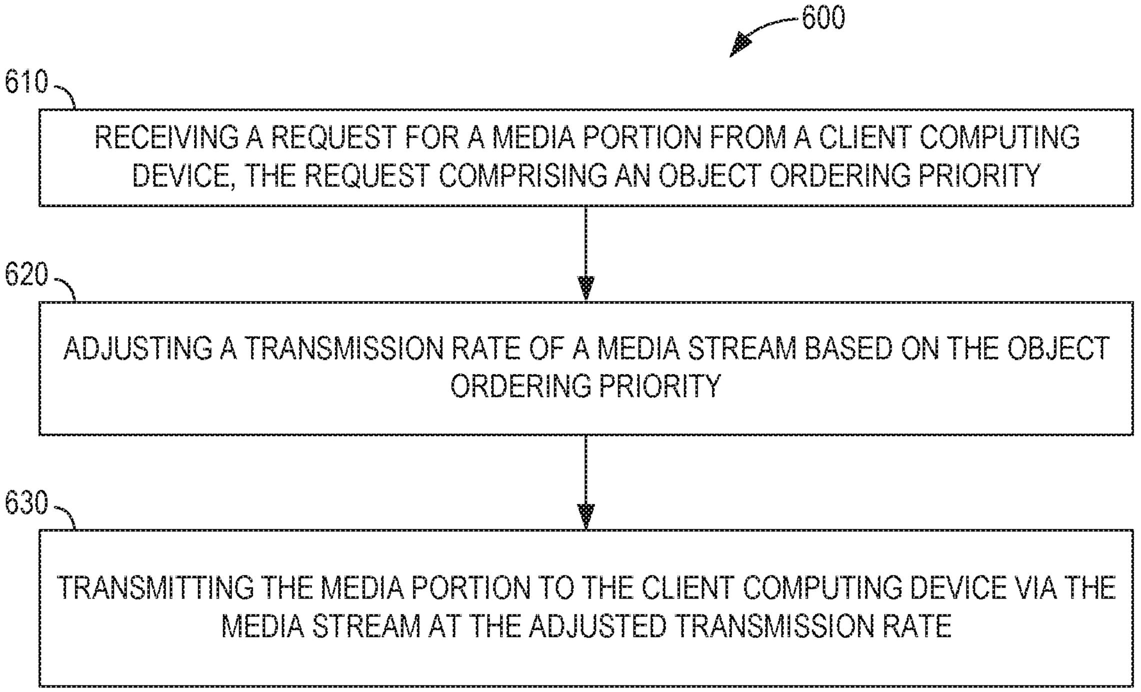
FIG. 6 is a flow diagram illustrating an example method implemented in a content server device according to one or more embodiments.

FIG. 6 illustrates an example method 600 implemented in a content server device 110. The method 600 comprises receiving a request 250 for a media portion 215 from a client computing device 115 (block 610). The request 250 comprises an object ordering priority 255. The method 600 further comprises adjusting a transmission rate of a media stream 245 based on the object ordering priority 255 (block 620), and transmitting the media portion 215 to the client computing device 115 via the media stream 245 at the adjusted transmission rate (block 630).

Figure 7:
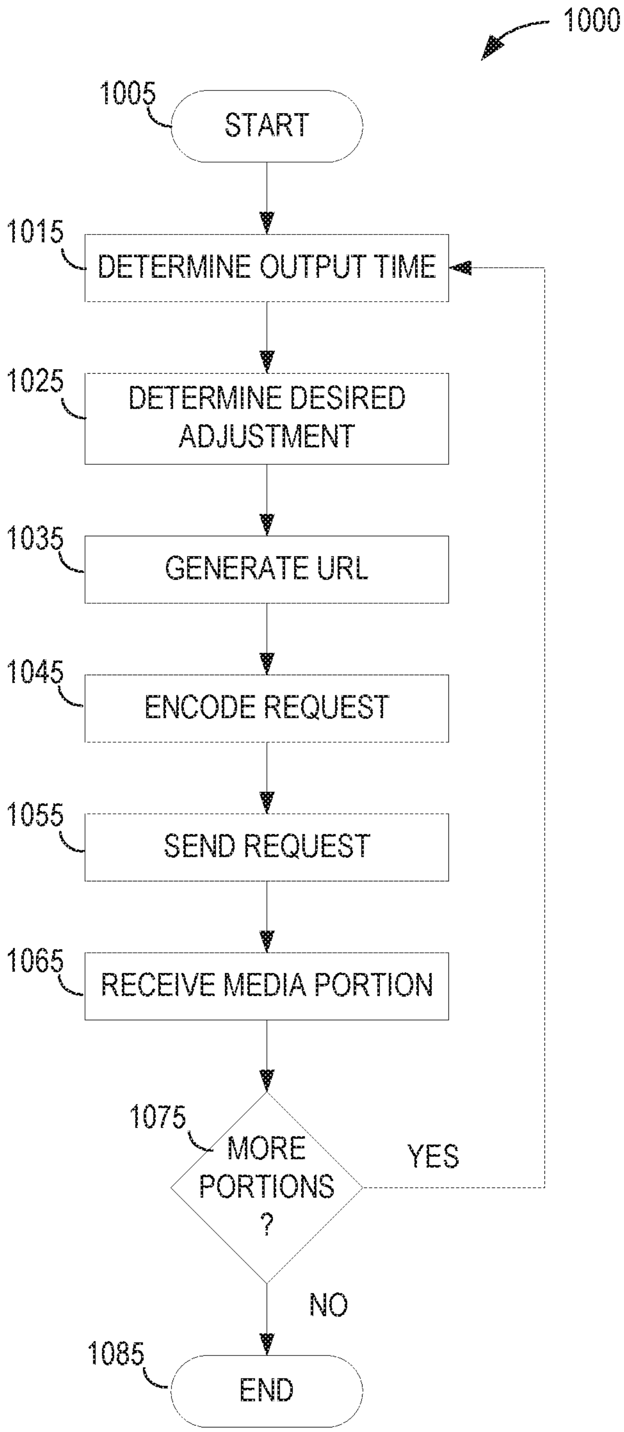
FIG. 7 is a flow diagram illustrating an example of a more detailed method implemented in a client computing device according to one or more embodiments.

FIG. 7 illustrates a more detailed method 1000 implemented in a client computing device 115. To start (block 1005), the method 1000 comprises determining a time to complete output of a previously received block 265 that was received in a media stream 245 (block 1015). The method 1000 further comprises determining a desired adjustment to a transmission rate of the media stream 245 (block 1025), and generating a URL comprising a name/value pair specifying the desired adjustment (block 1035). The method 1000 further comprises encoding the desired adjustment to the transmission rate in an object ordering priority field of a request 250 for a media portion 215 (block 1045). According to this example, the request 250 is a QUIC request. The encoding is based on the determined time to complete output, such that a higher or lower object ordering priority value is encoded as the object ordering priority responsive to the duration of time remaining being below or above a threshold, respectively. The method 1000 further comprises sending the request 250 to the content server device 110 to adjust the transmission rate of the media stream 245 with respect to the requested media portion 215 (block 1055), and subsequently receiving the media portion 215 at an adjusted transmission rate (block 1065). The method further comprises, if there are more media portions to receive (block 1075), determining the time to complete output again (block 1015, now with the previously received block 265 including media portion 215 stored into assigned space 240) and continuing with the method 1000 as previously described. If there are not more media portions to receive (block 1075), the method 1000 ends (block 1085).

Figure 8:
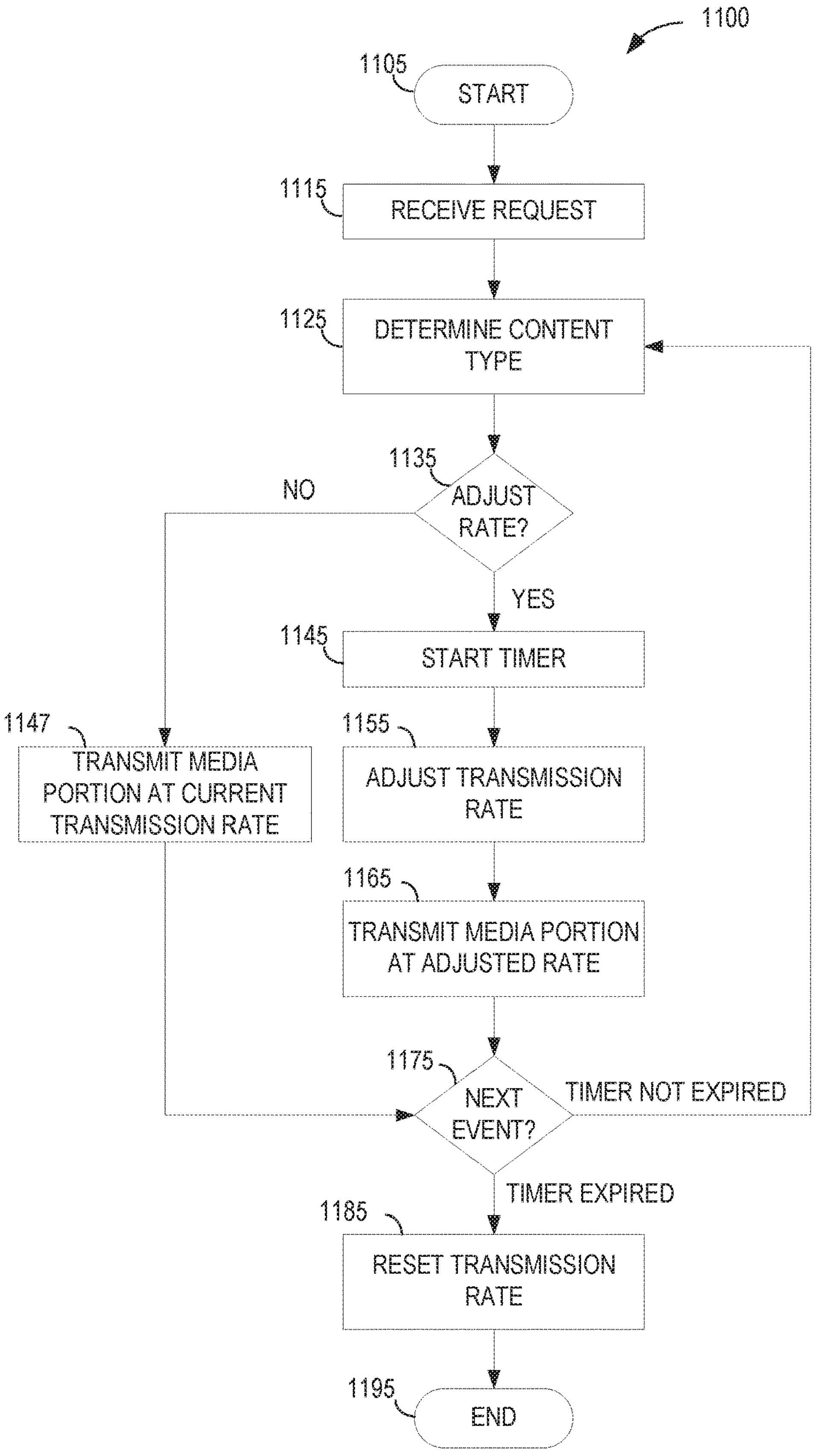
FIG. 8 is a flow diagram illustrating an example of a more detailed method implemented in a content server device according to one or more embodiments.

FIG. 8 illustrates a more detailed method 1100 implemented in a content server device 110. To start (block 1105), the method 1100 comprises receiving a request 250 for a media portion 215 from a client computing device 115 (block 1115). According to this example, the request 250 is a QUIC request and comprises an object ordering priority 255. The method 1100 further comprises determining a type of content in the requested media portion 215 (block 1125) and deciding, based on the determined content type, whether to adjust a transmission rate of the media stream 245 (block 1135).

In response to the content server device 110 determining that it will not adjust the transmission rate, the content server device 110 will transmit the requested media portion 215 to the client computing device 115 at the current transmission rate via the media stream 245 (block 1147) and await the next event, as will be described in greater detail below (block 1175). However, in response to the content server device 110 determining that it will adjust the transmission rate, the content server device 110 starts a timer (block 1145) and adjusts the transmission rate of the media stream 245 (block 1155). In this example, the transmission rate is adjusted based on the object ordering priority 255 in the request 250, such that the transmission rate is increased or decreased responsive to the object ordering priority 255 being higher or lower, respectively. The content server device 110 transmits the requested media portion 215 to the client computing device 115 via the media stream 245 at the adjusted transmission rate (block 1165). The content server device 110 will then await the next event (block 1175).

If the content server device 110 receives a further request from the client computing device 115 before the timer expires (block 1175), the content server device 110 will again determine a type of content comprised in the requested media portion 215 (block 1125) and again decide whether or not to adjust the transmission rate accordingly (block 1135), as previously described. However, if the timer expires before a further request from the client computing device 115 is received, the content server device 110 resets the transmission rate to a default rate (block 1185) and the method 1100 ends (block 1195).

Figure 9:
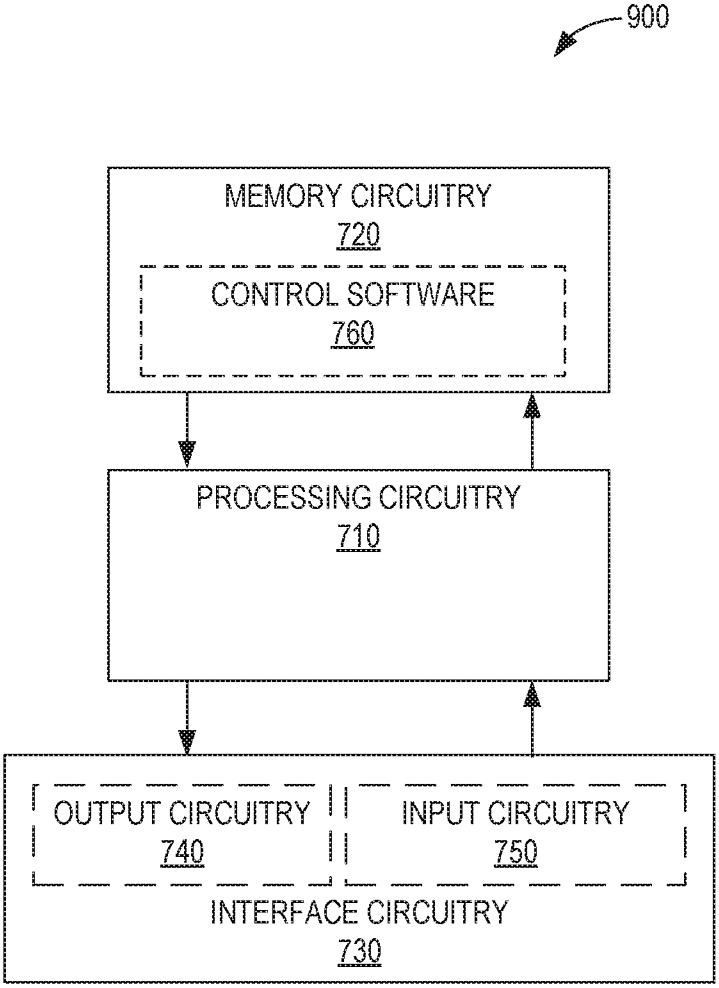
FIG. 9 is a block diagram illustrating example hardware according to embodiments.

Other embodiments of the present disclosure are implemented according to the example hardware 900 illustrated in FIG. 9. The hardware 900 comprises processing circuitry 710, memory circuitry 720, and interface circuitry 730. The processing circuitry 710 is communicatively coupled to the memory circuitry 720 and the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the content server device 110 or the client computing device 115, according to various embodiments. Such I/O data paths may include data paths for exchanging signals over a communication network 105 and data paths for exchanging signals with a user. For example, the interface circuitry 730 may comprise a transceiver configured to send and receive communication signals over one or more of a cellular network, Ethernet network, or optical network. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry 740 (e.g., transmitter circuitry configured to send communication signals over the communication network 105) and input circuitry 750 (e.g., receiver circuitry configured to receive communication signals over the communication network 105). Similarly, the output circuitry 740 may comprise a display, whereas the input circuitry 750 may comprise a keyboard. Other examples, permutations, and arrangements of the above and their equivalents will be readily apparent to those of ordinary skill.

According to embodiments of the hardware 900 as comprised in a client computing device 115, the interface circuitry 730 is configured to exchange communications with a content server device 110. The processing circuitry 710 is configured to determine a desired adjustment to a transmission rate of a media stream 245 received from a content server device 110 via the interface circuitry 730. The processing circuitry 710 is further configured to encode the desired adjustment to the transmission rate in an object ordering priority 255 field of a request 250 for a media portion 215. The processing circuitry 710 is further configured to send the request 250 via the interface circuitry 730 to the content server device 110 to adjust the transmission rate of the media stream 245 respect to the media portion 215.

According to embodiments of the hardware 900 as comprised in a content server device 110, the interface circuitry 730 is configured to exchange communications with a client computing device 115. The processing circuitry 710 is configured to receive a request 250 for a media portion 215 from a client computing device 115 via the interface circuitry 730. The request 250 comprises an object ordering priority 255. The processing circuitry 710 is further configured to adjust a transmission rate of a media stream 245 based on the object ordering priority 255, and transmit the media portion 215 to the client computing device 115 via the media stream 245 at the adjusted transmission rate via the interface circuitry 730.

Figure 10:
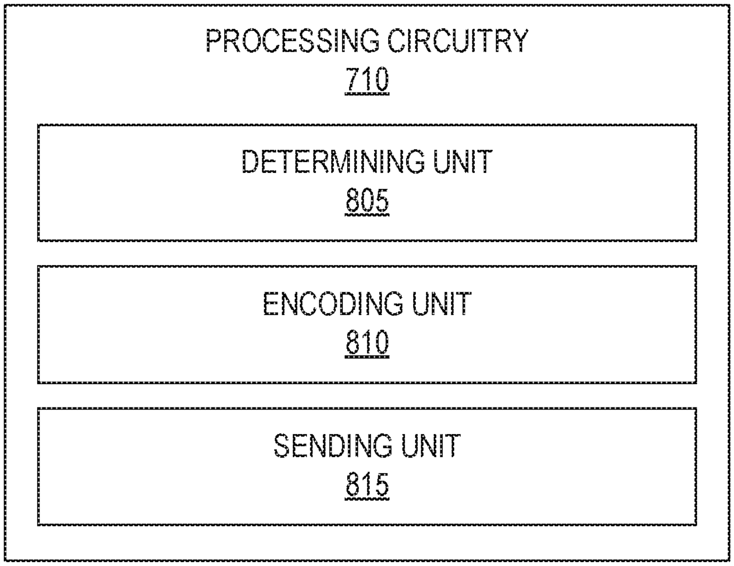
FIG. 10 is a block diagram illustrating example processing circuitry of a client computing device according to one or more embodiments.

FIG. 10 illustrates example processing circuitry 710 of a client computing device 115. The processing circuitry 710 of FIG. 10 comprises a plurality of communicatively coupled physical units. In particular, this processing circuitry 710 comprises a determining unit 805, an encoding unit 810, and a sending unit 815. The determining unit 805 is configured to determine a desired adjustment to a transmission rate of a media stream 245 received from a content server device 110. The encoding unit 810 is configured to encode the desired adjustment to the transmission rate in an object ordering priority 255 field of a request 250 for a media portion 215. The sending unit 815 is configured to send the request 250 to the content server device 110 to adjust the transmission rate of the media stream 245 with respect to the media portion 215. Other embodiments of the processing circuitry 710 of FIG. 10 may comprise other physical units configured to perform any of the functions discussed above.

Figure 11:
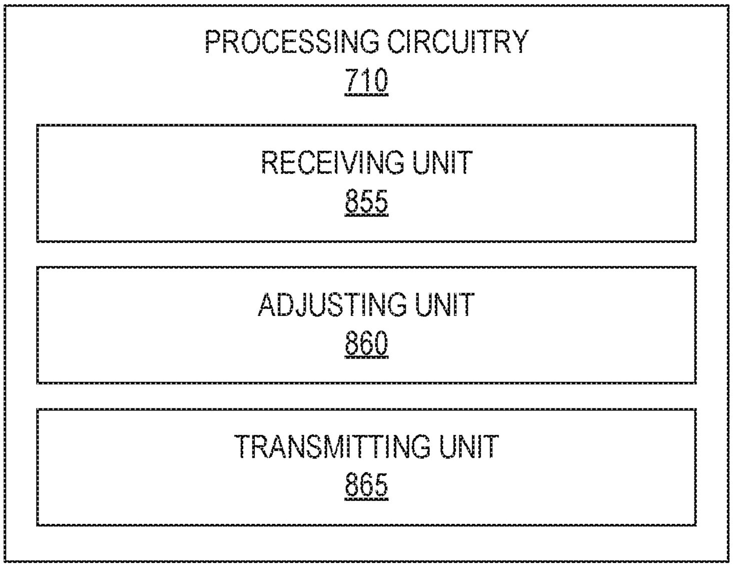
FIG. 11 is a block diagram illustrating example processing circuitry of a content server device according to one or more embodiments.

FIG. 11 illustrates example processing circuitry 710 of a content server device 110. The processing circuitry of FIG. 11 comprises a plurality of communicatively coupled physical units. In particular, this processing circuitry 710 comprises a receiving unit 855, an adjusting unit 860, and a transmitting unit 865. The receiving unit 855 is configured to receive a request 250 for a media portion 215 from a client computing device 115. The request 250 comprises an object ordering priority 255. The adjusting unit 860 is configured to adjust a transmission rate of a media stream 245 based on the object ordering priority 255. The transmitting unit 865 is configured to transmit the media portion 215 to the client computing device 115 via the media stream 245 at the adjusted transmission rate. Other embodiments of the processing circuitry 710 of FIG. 11 may comprise other physical units configured to perform any of the functions discussed above.

Figure 12:
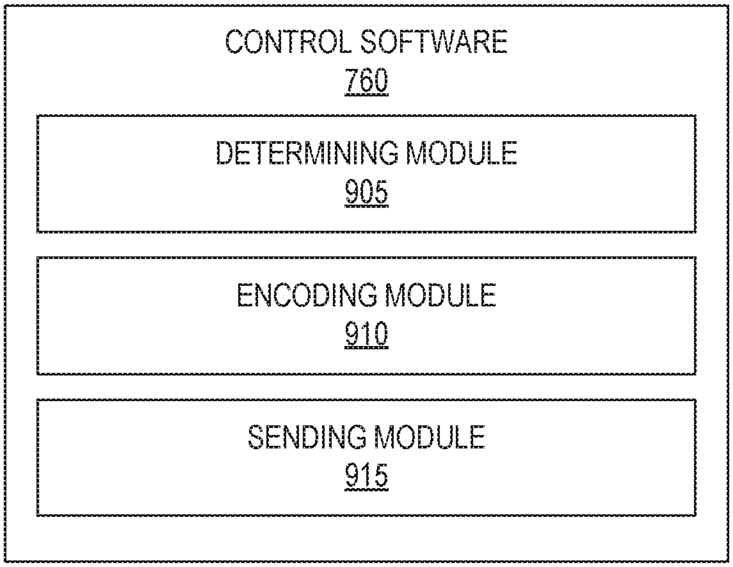
FIG. 12 is a block diagram illustrating example control software of a client computing device according to one or more embodiments.

FIG. 12 illustrates example control software 760 of a client computing device 115. The control software 760 of FIG. 12 comprises a plurality of software modules. In particular, this control software 760 comprises a determining module 905, an encoding module 910, and a sending module 915. The determining module 905 is configured to determine a desired adjustment to a transmission rate of a media stream 245 received from a content server device 110. The encoding module 910 is configured to encode the desired adjustment to the transmission rate in an object ordering priority 255 field of a request 250 for a media portion 215. The sending module 915 is configured to send the request 250 to the content server device 110 to adjust the transmission rate of the media stream 245 with respect to the media portion 215. Other embodiments of the control software 760 of FIG. 12 may comprise other software modules configured to perform any of the functions discussed above.

Figure 13:
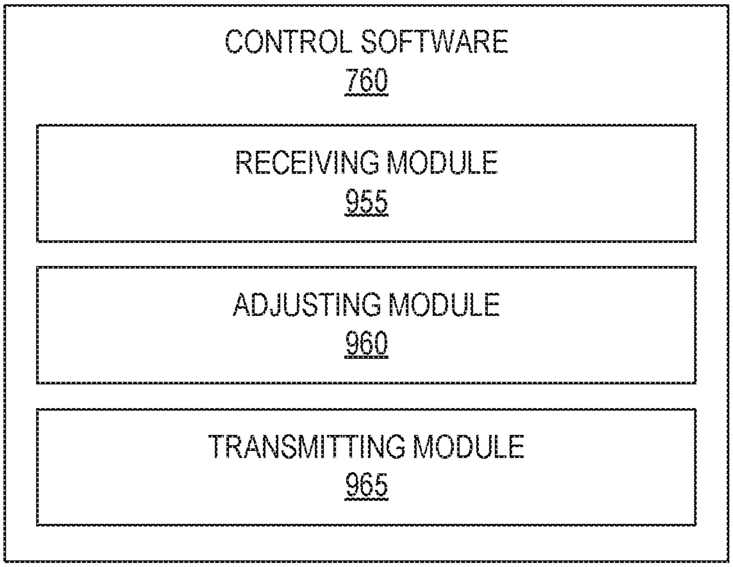
FIG. 13 is a block diagram illustrating example control software of a content server device according to one or more embodiments.

FIG. 13 illustrates example control software 760 of a content server device 110. The control software of FIG. 13 comprises a plurality of software modules. In particular, this control software 760 comprises a receiving module 955, an adjusting module 960, and a transmitting module 965. The receiving module 955 is configured to receive a request 250 for a media portion 215 from a client computing device 115. The request 250 comprises an object ordering priority 255. The adjusting module 960 is configured to adjust a transmission rate of a media stream 245 based on the object ordering priority 255. The transmitting module 965 is configured to transmit the media portion 215 to the client computing device 115 via the media stream 245 at the adjusted transmission rate. Other embodiments of the control software 760 of FIG. 13 may comprise other software modules configured to perform any of the functions discussed above.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, comprising a content server device:
- receiving a request for a media portion from a client computing device, the request comprising an object ordering priority;
- adjusting a transmission rate of a media stream based on the object ordering priority;
- transmitting the media portion to the client computing device via the media stream at the adjusted transmission rate.

2. The method of claim 1, wherein the adjusting the transmission rate comprises increasing or decreasing the transmission rate responsive to the object ordering priority being higher or lower, respectively, than a previous object ordering priority upon which the transmission rate was previously based.

3. The method of claim 1, further comprising:
- responsive to receiving the request comprising the object ordering priority, starting a timer; and
- responsive to the timer expiring, resetting the transmission rate to a default rate.

4. The method of claim 3, further comprising, responsive to receiving a further request comprising a further object ordering priority, resetting the timer.

5. The method of claim 1, wherein the adjusting the transmission rate comprises adjusting the transmission rate for the media stream based on a plurality of object ordering priorities received in respective requests for media portions.

6. The method of claim 5, wherein the plurality of object ordering priorities are selected based on a window in which the plurality of object ordering priorities were received.

7. The method of claim 1, further comprising:
- deciding to adjust the transmission rate based on a type of content in the media stream; and
- adjusting the transmission rate in response to the deciding.

8. The method of claim 1, wherein the request is a Quick UDP Internet Connections (QUIC) request.

9. A content server device, comprising:
- interface circuitry configured to exchange communications with a client computing device;
- processing circuitry communicatively coupled to the interface circuitry, wherein the processing circuitry is configured to:
  - receive a request for a media portion from the client computing device via the interface circuitry, the request comprising an object ordering priority;
  - adjust a transmission rate of a media stream based on the object ordering priority;

transmit the media portion to the client computing device via the media stream at the adjusted transmission rate via the interface circuitry.

10. A method, comprising a client computing device:

determining a desired adjustment to a transmission rate of a media stream received from a content server device;

encoding the desired adjustment to the transmission rate in an object ordering priority field of a request for a media portion;

sending the request to the content server device to adjust the transmission rate of the media stream with respect to the media portion.

11. The method of claim 10, wherein the encoding the desired adjustment to the transmission rate comprises encoding an object ordering priority value based on a duration of time remaining to complete output of a previously received media portion.

12. The method of claim 11, wherein the encoding the object ordering priority value comprises encoding a higher or lower object ordering priority value responsive to the duration of time remaining being below or above a threshold, respectively.

13. The method of claim 10, further comprising:

generating a Uniform Resource Locator (URL) comprising a name/value pair specifying the desired adjustment to the transmission rate;

wherein the encoding the desired adjustment to the transmission rate comprises encoding an object ordering priority value based on the value of the name/value pair in the URL.

14. The method of claim 10, wherein the request is a Quick UDP Internet Connections (QUIC) request.

15. A client computing device, comprising:

interface circuitry configured to exchange communications with a content server device;

processing circuitry communicatively coupled to the interface circuitry, wherein the processing circuitry is configured to:

determine a desired adjustment to a transmission rate of a media stream received from a content server device via the interface circuitry;

encode the desired adjustment to the transmission rate in an object ordering priority field of a request for a media portion;

send the request via the interface circuitry to the content server device to adjust the transmission rate of the media stream with respect to the media portion.

* * * * *